United States Patent
Brett et al.

(10) Patent No.: US 11,175,689 B2
(45) Date of Patent: Nov. 16, 2021

(54) SYSTEM AND METHOD OF EARLY TURNAROUND INDICATION FOR A D-PHY COMMUNICATION INTERFACE

(71) Applicant: NXP USA, Inc., Austin, TX (US)

(72) Inventors: Maik Brett, Taufkirchen (DE); Naveen Kumar Jain, Panipat (IN); Shreya Singh, Ranchi (IN); Anshul Goel, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/821,954

(22) Filed: Mar. 17, 2020

(65) Prior Publication Data

US 2021/0294375 A1 Sep. 23, 2021

(51) Int. Cl.
- *G06F 1/08* (2006.01)
- *G06F 1/24* (2006.01)
- *G06F 9/4401* (2018.01)
- *G06F 13/42* (2006.01)
- *G06F 1/16* (2006.01)

(52) U.S. Cl.
CPC ............... *G06F 1/08* (2013.01); *G06F 1/165* (2013.01); *G06F 1/24* (2013.01); *G06F 9/4411* (2013.01); *G06F 13/4282* (2013.01)

(58) Field of Classification Search
CPC ... G06F 1/08; G06F 1/165; G06F 1/24; G06F 9/4411; G06F 13/4282
See application file for complete search history.

(56) References Cited

U.S. PATENT DOCUMENTS

| | | | |
|---|---|---|---|
| 10,185,696 B2* | 1/2019 | Zhu | G06F 1/3287 |
| 10,649,946 B1* | 5/2020 | Brett | G06F 1/3215 |
| 10,692,410 B2* | 6/2020 | Han | G09G 3/006 |
| 2006/0069812 A1 | 3/2006 | Osborne | |

(Continued)

FOREIGN PATENT DOCUMENTS

WO  WO 2017/095534  6/2017

OTHER PUBLICATIONS

"Specification for D-PHY." Mipi® Alliance, Inc. Version 1.2. Aug. 1, 2014. pp. 1-121.

(Continued)

*Primary Examiner* — Brian T Misiura

(57) ABSTRACT

A communication system including a physical layer circuit, a timer circuit, and a turnaround controller. The physical layer circuit provides an early turnaround indication upon detection of a turnaround command and before completion of the turnaround command. The timer circuit is programmed with a timeout value indicative of a maximum time of a turnaround procedure initiated by the turnaround command. The turnaround controller starts the timer circuit in response to the early turnaround indication. A transmit controller may begin retrieving information to transmit from a memory in response to the early turnaround indication, and may begin transmitting the retrieved information if the turnaround procedure completes before timeout of the timer circuit. The retrieved information may be configuration information for a sensor. The turnaround controller provides an error indication if the timer circuit times out indicating a turnaround error. The error indication enables remedial action to be taken.

20 Claims, 3 Drawing Sheets

(56) References Cited

U.S. PATENT DOCUMENTS

| | | |
|---|---|---|
| 2010/0091921 A1 | 4/2010 | Den Besten et al. |
| 2010/0232304 A1 | 9/2010 | Den Besten |
| 2014/0094128 A1 | 4/2014 | Yu et al. |
| 2015/0098537 A1 | 4/2015 | Sengoku |
| 2017/0116150 A1 | 4/2017 | Wiley |
| 2017/0118039 A1 | 4/2017 | Wiley |
| 2017/0154009 A1 | 6/2017 | Zhu et al. |

OTHER PUBLICATIONS

Non-Final Rejection for U.S. Appl. No. 16/248,356, dated Aug. 30, 2019, 6 pages.
Final Rejection for U.S. Appl. No. 16/248,356, dated Dec. 20, 2019, 8 pages.
Notice of Allowance for U.S. Appl. No. 16/248,356, dated Mar. 2, 2020, 5 pages.
TEKTRONIX,"Understanding and Performing MIPI D-PHY Physical Layer, CSI and OSI Protocol Layer Testing", Application Note, 2010, 14 pages.
NXP, "NX3DV642 3-lane high-speed MIPI compatible switch. Product Date Sheet," Rev. 1, Aug. 20, 2012, 16 pages.
Minegishi, M., "Specifications—LPM089A128A", Japan Display Inc., Apr. 8, 2014, 70 pages.
U.S. Appl. No. 16/248,356, filed Jan. 15, 2019, Brett et al.

\* cited by examiner

SYSTEM AND METHOD OF EARLY TURNAROUND INDICATION FOR A D-PHY COMMUNICATION INTERFACE

BACKGROUND

Field of the Invention

The present invention relates in general to a D-PHY communication interface, and more particularly to adding an early turnaround indication that enables optimal timing for data transmission or early detection of turnaround errors for a D-PHY communication interface.

Description of the Related Art

D-PHY is a communications physical layer standard developed by the Mobile Industry Processor Interface (MIPI) Alliance, PHY working group. The term "D-PHY" as used herein is intended to encompass related or updated physical standards, such as C-PHY or M-PHY or the like. D-PHY is a low power, high speed serial interface using low-voltage differential signalling including an embedded clock lane. D-PHY is often used for point-to-point communications between a sensor device, such as a radar device or a camera device or the like, and a host system executing an application or the like that processes data from the sensor device. D-PHY is often configured as a bi-directional half-duplex communication link between a master (typically the sensor device) and a slave (typically the host system) in which the master is the default transmitter and the slave is the default receiver. The D-PHY standard by the MIPI Alliance defines a turnaround command and corresponding handshake procedure initiated by the transmitter using low-power (LP) signalling that is acknowledged by the receiver. The turnaround command is used to change direction so that the transmitter becomes the receiver and the receiver becomes the transmitter. The turnaround procedure enables the host or slave system to send data and information to the sensor or master system on a regular or periodic basis.

The D-PHY standard, however, does not provide any indication to a corresponding protocol layer for link reversal before turnaround completion, allowing only the transmit side of the protocol to be aware of any turnaround errors. If a change in direction is not detected by the receiver, the standard does not provide a way for the receive side to determine turnaround completion failure thereby resulting in a complete deadlock of the serial interface. In addition, since the receive side software or protocol becomes aware of the turnaround only after the actual direction change, it is difficult to provide up-to-date information to the sensor upon turnaround. If it is desired, for example, to reduce the inter packet gap or to reduce the chirp pause time, then the receive side has to pick up any configuration information well in advance of turnaround or after the turnaround procedure is complete. Thus, the most up-to-date configuration information is not available in time or a significant latency occurs having to wait to retrieve the configuration information until after completion of the turnaround procedure.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

The inventors have recognized reliability and efficiency issues with the conventional configuration of the D-PHY communication interface. The DPHY interface, for example, does not provide any indication to a protocol layer for link reversal before turnaround completion, allowing only the transmit side of the protocol to be aware of any turnaround errors. Also, the receive side software or protocol becomes aware of the turnaround only after the actual direction change, so that optimal data transmission to the sensor system is difficult to achieve. They have therefore developed D-PHY interface circuitry providing an early turnaround indication to the protocol layer. The early indication enables optimal fetch and transmission of up-to-date configuration information. The early indication also enables early detection of any turnaround errors so that the system can take remedial measures.

Figure 1:
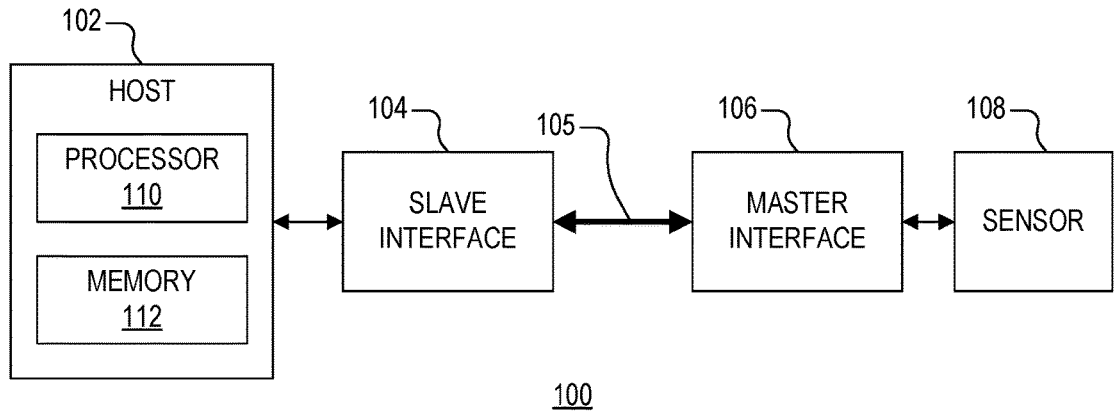
FIG. 1 is a simplified block diagram of a D-PHY communication system implemented according to one embodiment of the present disclosure.

FIG. 1 is a simplified block diagram of a D-PHY communication system 100 implemented according to one embodiment of the present disclosure. The D-PHY communication system 100 includes a host system 102, a slave interface 104, a master interface 106, and a sensor 108. The master and slave interfaces 104 and 106 communicate with each other via a communication link 105 configured according to the D-PHY standard. The D-PHY communication system 100 is implemented according to any one of many different applications in which the sensor 108 senses or otherwise collects data or information and transmits the information to the host system 102 via the master and slave interfaces 104 and 106 and the communication link 105. The sensor 108 may be, for example, a camera or camera system or a radar device or the like. The serial interface may generally be configured according to the D-PHY standard typically used for communication interconnection between components inside a mobile device or entity. For example, one application is a camera or radar system of an automobile advanced driver-assistance system (ADAS) or the like.

The host system 102 includes a processor 110 and a memory 112. The processor 110 may be any type of processing circuitry which may include a processing device such as a microcontroller, a microprocessor, a central processing unit (CPU), etc. The memory 112 may include any suitable combination of separate read-access memory (RAM) and read-only memory (ROM) devices. The processor 110 may execute application software or firmware stored in the memory 112 for processing data and information received from the sensor 108. Although shown as separate blocks, one or more of the blocks may be integrated into a system-on-chip (SoC) or the like. In one embodiment, for example, the sensor 108 and the master interface 106 may be implemented on one electronic device and the host system 102 and the slave interface 104 may be implemented on another electronic device interfaced via the communication link 105.

The slave and master interfaces 104 and 106 may be implemented according to the D-PHY standard by the MIPI Alliance such as for implementing a bi-directional, half-duplex serial communication link between the sensor 108 and the host system 102. The communication link 105 includes a clock lane and one or more data lanes in which each lane is a 2-wire link for differential signalling. Upon startup or power up (POR) in the default configuration, the master interface 106 is the default transmitter and the slave interface 104 is the default receiver, in which the master interface 106 transmits data collected by the sensor 108 in a forward direction to the slave interface 104. On a regular or periodic basis, the master interface 106 initiates a turnaround procedure by sending a turnaround command to temporarily reverse the communication direction, which enables the host system 102 to transmit information to the sensor 108 via the slave and master interfaces 104 and 106. The slave interface 104 acknowledges the turnaround command to complete the turnaround procedure. In one embodiment, communication in the reverse direction enables the host system 102 to send updated configuration information to the sensor 108, in which configuration information may include operating parameters, updated status values, configuration values, etc. After transmitting any configuration information, the slave interface 104 may initiate the turnaround procedure in the reverse direction to return to default operation.

Figure 2:
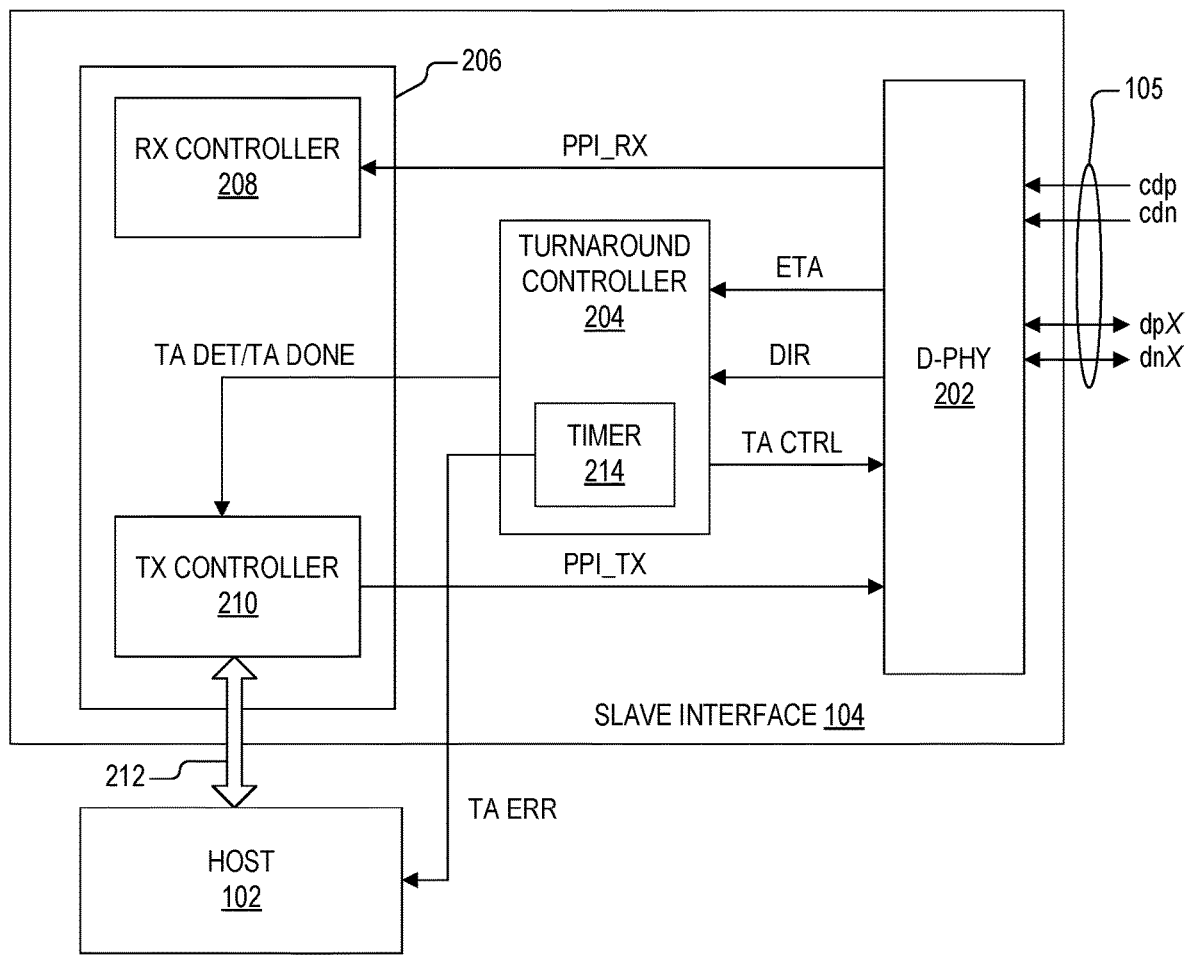
FIG. 2 is a more detailed block diagram of the slave interface coupled to the host system and the communication link of FIG. 1 according to one embodiment of the present disclosure.

FIG. 2 is a more detailed block diagram of the slave interface 104 coupled to the host system 102 and the communication link 105 according to one embodiment of the present disclosure. Although not specifically shown, the master interface 106 may be configured in an identical or similar manner. The slave interface 104 includes a bi-directional physical interface (D-PHY) 202, a turnaround controller 204, and a link layer controller 206 including a receiver (RX) controller 208 and a transmitter (TX) controller 210. The link layer controller 206 communicates with the host system 102 via a bus 212 or the like. The D-PHY 202 interfaces the communication link 105, which has a clock lane including a positive clock line cdp and a negative clock line cdn. The communication link 105 also includes one or more (e.g., N) data lanes each having a positive data line dpX and a negative data line dnX in which X is an index that ranges from 1 to N (e.g., dp1/dn1, . . . , dpN, dnN). N may be any suitable integer greater than zero depending upon the configuration.

The D-PHY 202 is the physical layer of the communication interface and may include any combination of drivers, receivers, serial to parallel converters, parallel to serial converters, low power and high speed sequence controllers, etc. The D-PHY 202 interfaces the RX controller 208 via a PHY-Protocol Interface (PPI) receive interface PPI RX for forwarding received information from the sensor 108 to the host system 102. The RX controller 208 may perform various receive functions including, for example, lane merging, data extraction, cyclical redundancy check (CRS), error correction code (ECC) checks, etc. the D-PHY 202 interfaces the TX controller 210 via a PPI transmit interface PPI_TX for transmitting information from the host system 102 to the sensor 108. The TX controller 210 may perform various transmit functions including, for example, adding CRC and/or ECC, striping information into data lanes, etc.

The D-PHY 202 provides a direction (DIR) signal to the turnaround controller 204 identifying the direction status of the communication link 105. The DIR signal initially indicates the direction status as the default forward direction in which the master interface 106 is the transmitter and the slave interface 104 is initially the receiver by default. After completion of a turnaround procedure initiated by the master interface 106, the slave interface 104 becomes the transmitter and the master interface 106 becomes the receiver and the DIR signal is updated to reflect the direction status as the reverse direction. The turnaround controller 204 may provide one or more turnaround control (TA CTRL) signals to instruct the D-PHY 202 to transmit another turnaround command to the master interface 106 to change communication direction back to the default configuration. The RX controller 208 may store received data and information into the memory 112 for processing by the processor 110. The TX controller 210 may retrieve configuration information from the memory 112 and send the retrieved information to the sensor 108 via the D-PHY 202.

During normal operation for transmission of information in the forward direction, the sensor 108 senses or otherwise detects information, converts the sensed information into a suitable format (e.g., digitizes analog data), and transmits the sensed information to the host system 102 for processing. On a regular or periodic basis, the timing of which may be established beforehand, the master interface 106 sends the turnaround command to the slave interface 104, which acknowledges the turnaround command to complete the turnaround procedure. This enables the slave interface 104 to send configuration information (or other information) to the sensor 108, and the slave interface 104 then initiates another turnaround procedure to the master interface 106. Once the turnaround is acknowledged by the master interface 106 and the turnaround procedure is complete, communication may resume in the forward direction.

The conventional D-PHY serial communication standard has several efficiency issues. The timing of the turnaround procedure may vary from one system to the next or even from one turnaround procedure to the next in a given system. The host system 102 either anticipates and estimates the timing of completion of the turnaround procedure for prompting the TX controller 210 to retrieve configuration information from the memory 112 for transmission to the sensor 108, or waits for the turnaround procedure to be completed before prompting transmission. When the timing is estimated, the TX controller 210 usually retrieves the configuration information too early so that the information may be stale by the time it is ultimately sent. When the TX controller 210 waits for the turnaround procedure to complete before retrieving the configuration information, a significant latency occurs between the host system 102 and the sensor 108. In addition, if for any reason the slave interface 104 fails to detect the turnaround command then in the conventional configuration, there is no way for either the slave interface 104 or the host system 102 to discover the turnaround completion failure which may result in a complete deadlock of the serial interface. The master interface 106 may detect failure of the slave interface 104 to acknowledge the turnaround command, but is unable to communicate the failure to the host system 102.

As further described herein, the D-PHY 202 is configured to provide an early turnaround (ETA) signal to the turnaround controller 204 upon detecting a front-end portion of the turnaround command. Providing or assertion of the ETA signal is an early turnaround indication of detection of the turnaround command. The ETA signal is provided by the D-PHY 202 as soon as it is known that the transmitter will not abort the turnaround command and before the turnaround command is completed. In response to the ETA signal, the turnaround controller 204 generates and provides a turnaround detect (TA DET) signal to the TX controller 210. This prompts the TX controller 210 to access the memory 112 and retrieve the configuration information and the like on a timely basis, such as a just-in-time basis. The D-PHY 202 updates the DIR signal when the turnaround procedure is complete. When the turnaround controller 204 detects the update of the DIR signal, it immediately informs the TX controller 210 via a turnaround complete (TA DONE) signal, which can then begin transmitting the most up-to-date configuration information to the sensor 108. The TA DET and TA DONE signals are real-time signals sent immediately or otherwise as soon as practicable in response to the ETA and DIR signals, respectively. The TA DET signal may be considered a forwarded version of the ETA indication. Such early turnaround detection and indication avoids retrieving stale configuration information and further minimizes latency across the communication link 105 between the host system 102 and the sensor 108.

The turnaround controller 204 further includes a timer circuit 214. Upon receiving the early ETA signal from the D-PHY 202, the turnaround controller 204 initiates the timer circuit 214 to start a predetermined timeout period. If the timer circuit 214 times out before the turnaround procedure is complete as indicated by the DIR signal, then the turnaround controller 204 asserts a turnaround error (TA ERR) signal to the host system 102 which is detected by the processor 110. The timeout period may be configured as a maximum allowable time for the turnaround procedure to complete. The timer circuit 214 may be programmable to program different timeout periods for different configurations or implementations. The TA ERR signal may be in the form of an interrupt or the like. In response to the TA ERR signal, the processor 110 may take redemptive action, such as restarting or resetting the serial communication interface including, for example, restarting or resetting the master and slave interfaces 104 and 106. The use of the timer circuit 214 for detecting the timeout period enables early detection of a turnaround completion failure and prevents complete deadlock between the transmitter and receiver of the serial communication link. The timer circuit 214 may be implemented in any suitable manner, such as a digital counter or the like.

Figure 3:
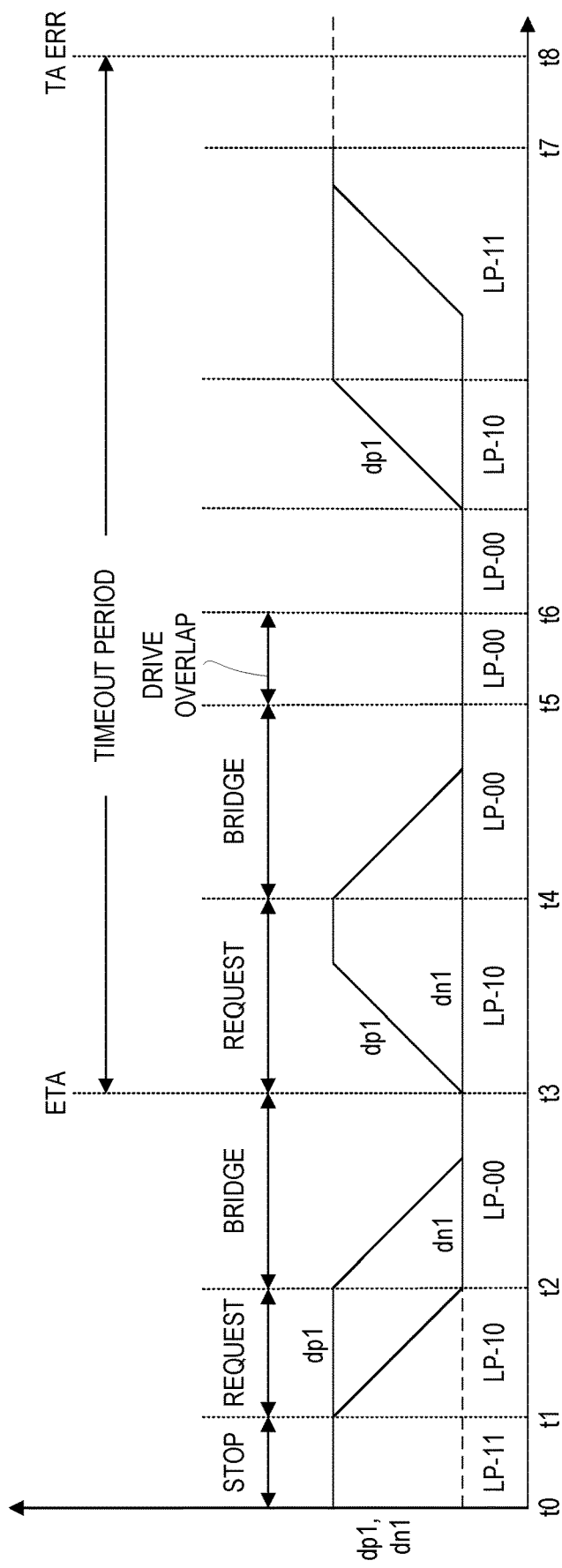
FIG. 3 is a timing diagram illustrating the turnaround procedure including the turnaround command, the turnaround acknowledgment, and the early turnaround indication according to one embodiment of the present disclosure.

FIG. 3 is a timing diagram illustrating the turnaround procedure including the turnaround command, the turnaround acknowledgment, and the early turnaround indication (e.g., assertion of the ETA signal) according to one embodiment of the present disclosure. Data signals dp1 and dp2 are plotted versus time for a first data lane for N=1. Operation may be similar for other data lanes. The turnaround command and acknowledgment are indicated by asserting a series of low power (LP) state codes of the data signal dp1 and dp2. The transmitter initiates the turnaround procedure by asserting the turnaround command, which is followed by a drive overlap period, and which is then completed by an acknowledgment by the receiver. Once the turnaround procedure is completed, the transmit/receive roles are reversed allowing communication in the reverse direction until the slave issues the same turnaround command to return to the default forward direction. In FIG. 3, the transmitter is assumed to be the master interface 106 and the receiver is the slave interface 104.

At an initial time t0, the transmitter asserts a state code of LP-11 on the data signal lines dp1/dp2. This means that both data signal lines dp1 and dp2 are pulled to a high level so that both are at logic 1. The state code LP-11 may be referred to as a stop state. At subsequent time t1, the transmitter begins asserting a state code of LP-10 on the data signal lines dp1/dp2 meaning that dp1 remains high while dp2 goes low to logic 0. The state code LP-10 may be referred to as a request state. At subsequent time t2, the transmitter begins asserting a state code of LP-00 on the data signal lines dp1/dp2 meaning that dp1 also goes low to logic 0. The state code LP-00 may be referred to as a bridge state. At subsequent time t3, the transmitter begins asserting another request state LP-10. At subsequent time t4, the transmitter begins asserting another bridge state LP-00 until a subsequent time t5. A drive overlap period occurs from time t5 to subsequent time t6 during which drivers within the D-PHY 202 are enabled for transmission. Beginning at time t6 and ending at time t7, the D-PHY 202 of the slave interface 104 acknowledges the turnaround command by asserting sequential state codes LP-00, LP10, and LP-11. At or just after time t7, the D-PHY 202 updates the DIR signal to the turnaround controller 204 to indicate completion of the turnaround procedure and communication reversal, and the slave interface 104 resumes the role as the transmitter assuming a turnaround error has not occurred. Although not shown, the slave interface 104 may transmit information to the master interface 106 and then provide another turnaround command in the reverse direction, which is acknowledged by the master interface 106 to return the forward default configuration.

At time t3 upon completion of the first bridge state code LP-00 and beginning the second request state code LP-10 during the turnaround command, the transmitter is considered committed and does not abort the turnaround command. At time t3, the D-PHY 202 provides the ETA signal to the turnaround controller 204. In this manner, the ETA signal is provided during the turnaround command and well before the turnaround procedure is completed. As previously described, in response to the ETA signal, the turnaround controller 204 starts the timer circuit 214 and provides the TA DET signal to inform the TX controller 210 that a turnaround procedure has been detected. The TX controller 210 retrieves any information from the memory 112 to being populating a data pipeline (not shown) of information to send to the sensor 108. When the turnaround procedure is acknowledged by the slave interface 104 completing the turnaround procedure, the D-PHY 202 updates the DIR signal to the turnaround controller 204, which responsively provides the TA DONE signal to enable the TX controller 210 to begin transmitting information from the data pipeline. In this manner, the most up-to-date configuration information may be sent to the sensor 108. If for any reason the timer circuit 214 times out before the DIR signal changes state, then the turnaround controller 204 asserts the TA ERR signal at subsequent time t8 to inform the processor 110 of the host system 102 of a turnaround error. The time between t3 (assertion of the ETA signal) to the time t8 (possible assertion of the TA ERR signal if TA DONE signal not yet asserted) is referred to as a timeout period indicating timeout of the timer circuit 214.

Figure 4:
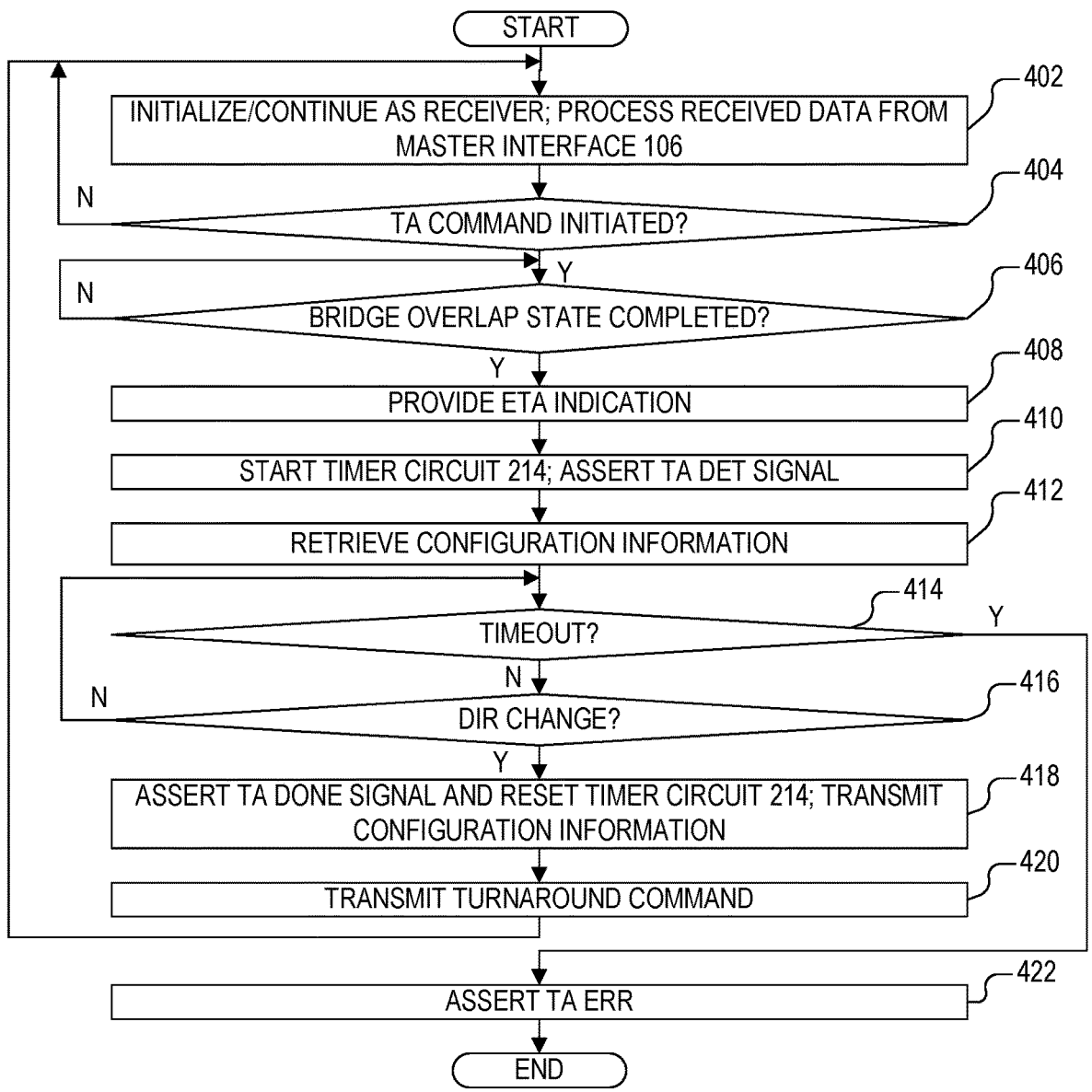
FIG. 4 is a flowchart diagram illustrating operation of the slave interface of FIG. 1 according to one embodiment of the present disclosure.

FIG. 4 is a flowchart diagram illustrating operation of the slave interface 104 according to one embodiment of the present disclosure. Upon POR or the like, operation proceeds to block 402 in which the slave interface 104 initializes as the default receiver. While operating as the receiver, the slave interface 104 processes data received from the master interface 106 as previously described. During operation, the D-PHY 202 monitors commands on the applicable data lane and queries at block 404 if a turnaround (TA) command is initiated. While a TA command is not detected, operation loops between blocks 402 and 404 during normal forward direction operation.

When the D-PHY 202 detects initiation of a TA command at block 404, such as detecting sequential state codes LP-11, LP10, and LP-00 on the applicable data lane, operation proceeds to block 406 to determine when the bridge overlap state LP-00 is completed. Operation loops at block 406 until the bridge overlap state is completed, and then operation proceeds to block 408 in which the D-PHY 202 provides the ETA signal. At next block 410, the turnaround controller 204 starts the timer circuit 214 and asserts the TA DET signal in response to the ETA signal. At next block 412, the TX controller 210 retrieves the latest configuration information, if any, from the memory 112.

Operation then advances to block 414 in which the turnaround controller 204 snoops the timer circuit 214 for timeout, and if timeout has not occurred, operation advances to block 416 in which the turnaround controller 204 snoops the DIR signal to determine when the turnaround procedure is completed and the transmit direction is reversed as indicated by a change of the DIR signal. Operation loops between blocks 414 and 416 until either timeout of the timer circuit 214 or completion of the turnaround procedure as indicated by the DIR signal. If the turnaround procedure completes before timeout of the timer circuit 214, operation advances to block 418 in which the turnaround controller 204 asserts the TA DONE signal and resets the timer circuit 214. In response, the TX controller 210 begins transmitting the retrieved configuration information to the master interface 106. Upon completion of high speed transmission, operation advances to block 420 in which the D-PHY 202 transmits the turnaround command to return to normal operation. Operation then loops back to block 402 to repeat the process.

If timeout of the timer circuit 214 occurs at block 414 before DIR changes to indicate completion of the turnaround procedure, operation proceeds instead to block 422 in which the turnaround controller 204 asserts the TA ERR signal and operation is completed. The host system 102 receives the TA ERR signal and may then perform any remedial measures as previously described.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive logic or negative logic may be used in various embodiments in which the present invention is not limited to specific logic polarities, device types or voltage levels or the like. For example, logic states, such as logic low and logic high may be reversed depending upon whether the pin or signal is implemented in positive or negative logic or the like. In some cases, the logic state may be programmable in which the logic state may be reversed for a given logic function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A communication system, comprising:
a physical layer circuit interfacing data signal lines, wherein the physical layer circuit provides an early turnaround indication upon detection of a turnaround command initiated on the data signal lines, and wherein the early turnaround indication is provided before completion of the turnaround command;
a timer circuit programmed with a timeout value indicative of a maximum time of a turnaround procedure initiated by the turnaround command; and
a turnaround controller that receives the early turnaround indication and that starts the timer circuit.

2. The communication system of claim 1, wherein:
the turnaround controller forwards the early turnaround indication to a transmit controller before the turnaround command is completed; and
wherein the transmit controller begins retrieving information from a memory upon receiving the early turnaround indication.

3. The communication system of claim 2, wherein the physical layer circuit updates a direction signal upon completion of the turnaround procedure.

4. The communication system of claim 3, wherein the transmit controller begins transmitting the information retrieved from the memory via the physical layer circuit in response to the direction signal being updated.

5. The communication system of claim 1, wherein the physical layer circuit indicates a direction change upon completion of the turnaround procedure, and wherein the turnaround controller resets the timer circuit when the direction change is indicated before timeout of the timer circuit.

6. The communication system of claim 1, wherein the turnaround controller provides an error indication upon timeout of the timer circuit indicating a turnaround error before the physical layer circuit indicates a direction change.

7. The communication system of claim 6, further comprising a host system that performs a correction process of the communication system in response to the error indication by the turnaround controller.

8. The communication system of claim 1, wherein the turnaround command comprises in sequential order first a stop state, second a first request state, third a first bridge state, fourth a second request state, and fifth a second bridge state.

9. The communication system of claim 8, wherein the physical layer circuit provides the early turnaround indication upon completion of the first bridge state.

10. The communication system of claim 1, wherein the physical layer circuit communicates via the data signal lines according to a D-PHY standard.

11. A method of operating a communication system interfacing data signal lines, comprising:
detecting a turnaround command initiated on the data signal lines;
providing an early turnaround indication before completion of the turnaround command; and
starting a timer circuit programmed with a timeout value indicative of a maximum time of a turnaround procedure initiated by the turnaround command.

12. The method of claim 11, further comprising:

forwarding the early turnaround indication to a transmit controller before the turnaround command is completed; and beginning retrieving information from a memory, by the transmit controller, upon receiving the early turnaround indication.

13. The method of claim 12, further comprising updating a direction status upon completion of the turnaround procedure.

14. The method of claim 13, further comprising beginning transmitting the information retrieved from the memory via the data signal lines when the direction status is updated.

15. The method of claim 11, further comprising resetting the timer circuit when a change of direction status is indicated before timeout of the timer circuit.

16. The method of claim 11, further comprising providing an error indication upon timeout of the timer circuit before a change of direction status is indicated.

17. The method of claim 16, further comprising performing a correction process of the communication system in response to the error indication.

18. The method of claim 11, wherein the detecting a turnaround command comprises, in sequential order, first detecting a stop state, second detecting a first request state, third detecting a first bridge state, fourth detecting a second request state, and fifth detecting a second bridge state.

19. The method of claim 18, wherein the providing an early turnaround indication comprises providing the early turnaround indication when the first bridge state is completed.

20. The method of claim 11, further comprising operating the communication system according to a D-PHY standard.

* * * * *